United States Patent

Morin

[11] Patent Number: 6,138,477
[45] Date of Patent: Oct. 31, 2000

[54] PROCESS AND APPARATUS FOR THE FORMING OF GLASS PLATES AND APPLICATION OF SAID PROCESS TO OBTAINING GLAZINGS WITH COMPLEX SHAPES

[75] Inventor: Claude Morin, Courbevoie, France

[73] Assignee: Saint Gobain Vitrage, Courbevoie, France

[21] Appl. No.: 09/137,424

[22] Filed: Aug. 20, 1998

Related U.S. Application Data

[62] Continuation of application No. 08/852,377, May 7, 1997, Pat. No. 6,044,662, which is a continuation of application No. 08/392,739, filed as application No. PCT/FR94/00847, Jul. 7, 1994, abandoned.

[30] Foreign Application Priority Data

Jul. 9, 1993 [FR] France ................................. 93 08455

[51] Int. Cl.⁷ .......................... C03B 23/025; C03B 23/03; C03B 23/035
[52] U.S. Cl. ............................... 65/107; 65/182.2; 65/290
[58] Field of Search .......................... 65/106, 107, 182.2, 65/287–291

[56] References Cited

U.S. PATENT DOCUMENTS

5,340,375  8/1994  Anttonen .
5,372,624  12/1994  LeSage et al. .

FOREIGN PATENT DOCUMENTS

0183418   6/1986   European Pat. Off. .
0520886   12/1992  European Pat. Off. .
93/06052  4/1993   WIPO .

*Primary Examiner*—Jan Ludlow
*Attorney, Agent, or Firm*—Oblon, Spivak, McClelland, Maier & Neustadt, P.C.

[57] ABSTRACT

There is disclosed a method for bending a sheet of glass heated to a bending temperature in a horizontal furnace through which it is conveyed by a plane conveyor delivering the glass sheet to a bending cell heated to substantially the same temperature as the bending temperature. A concave annular recessed portion moves the glass sheet vertically towards a solid convex projecting portion within the cell, so that the sheet is squeezed between the concave and convex portions. A device for carrying out the method and its use for producing glazing with a particularly complex shape are also disclosed.

6 Claims, 3 Drawing Sheets

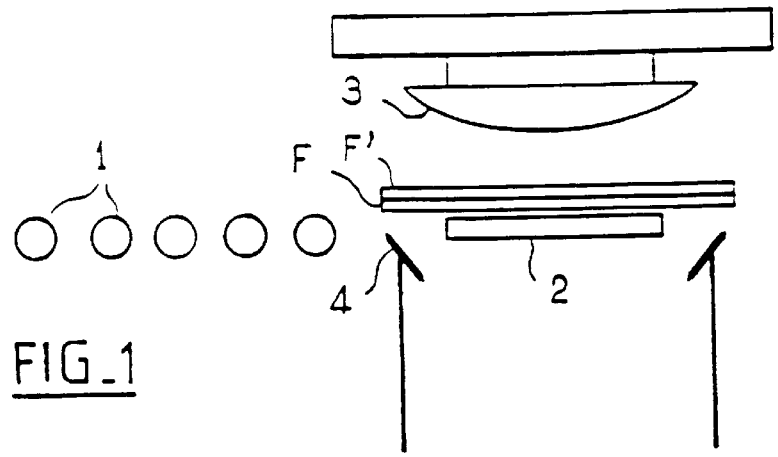
FIG_1
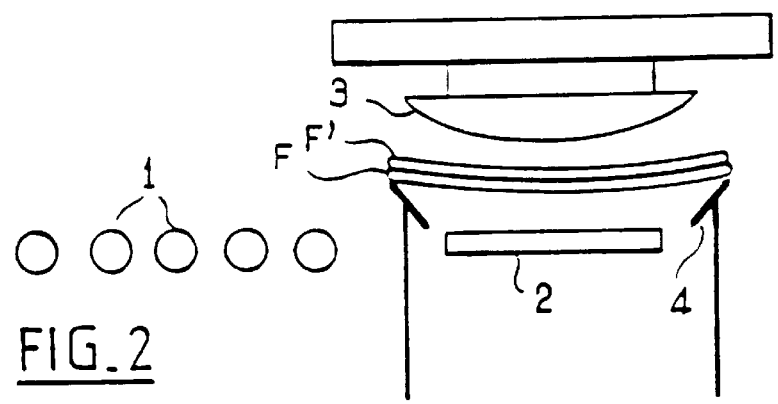
FIG_2
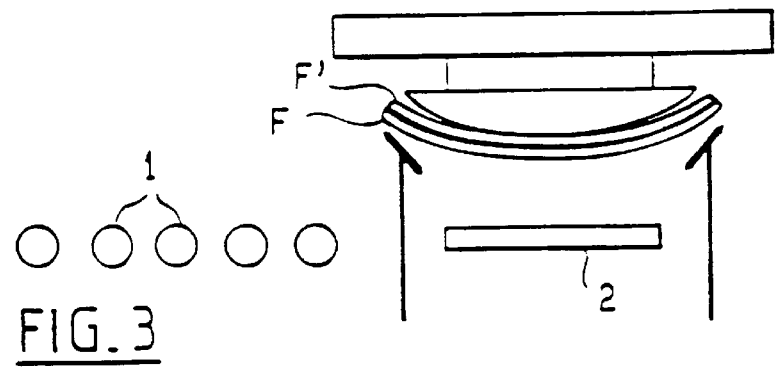
FIG_3
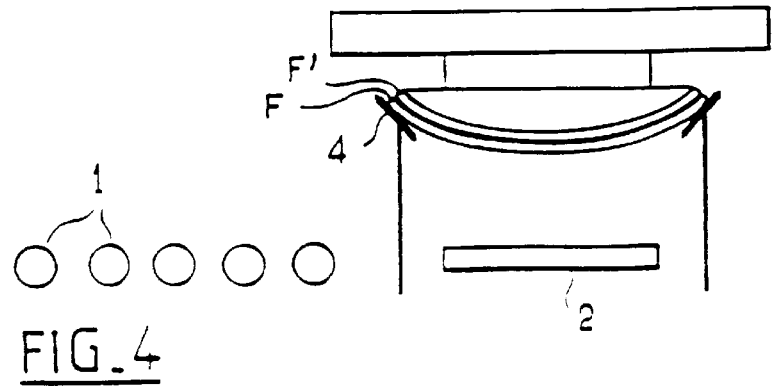
FIG_4

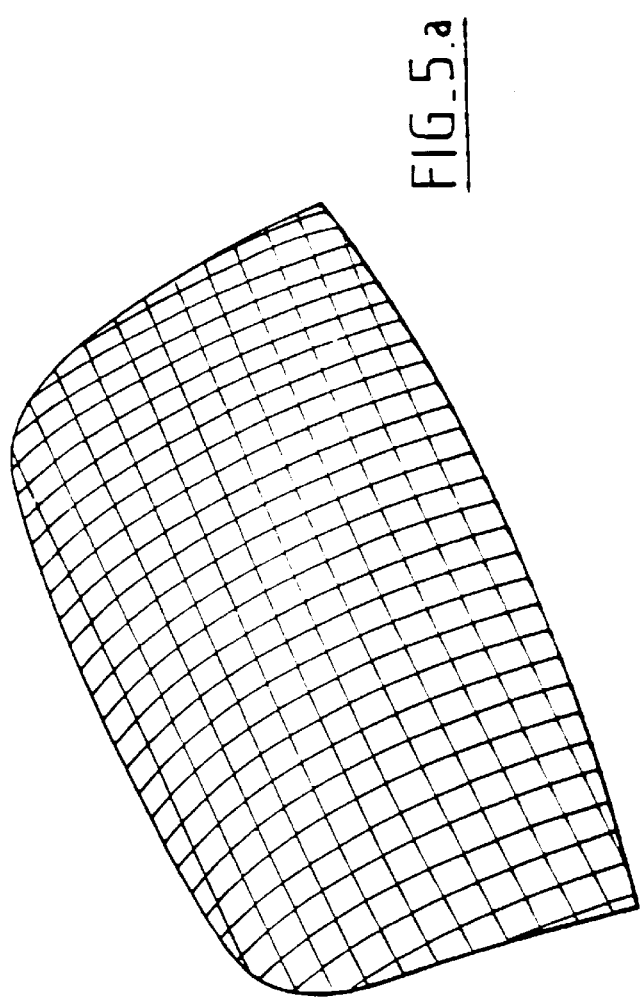
FIG.5.a
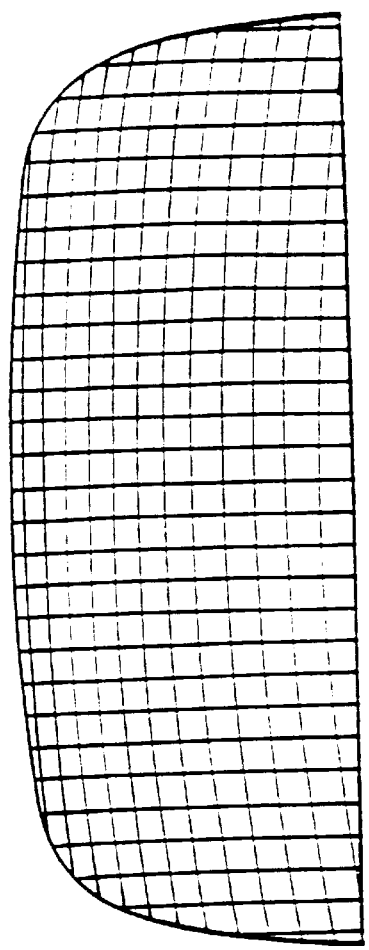
FIG.5.b
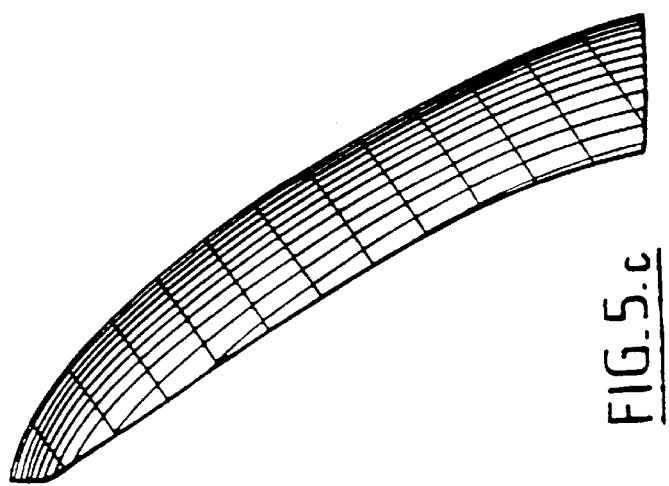
FIG.5.c

PROCESS AND APPARATUS FOR THE FORMING OF GLASS PLATES AND APPLICATION OF SAID PROCESS TO OBTAINING GLAZINGS WITH COMPLEX SHAPES

This application is a continuation of application Ser. No. 08/852,377, filed on May 7, 1997, now U.S. Pat. No. 6,044,662, which is a continuation of application Ser. No. 08/392,739, filed on Apr. 24, 1995, now abandoned, which is a 371 application PCT/FR94/00847, filed on Jul. 7, 1994.

BACKGROUND OF THE INVENTION

1. Field of the Invention

The present invention relates to procedures for forming glass sheets with a view to producing tempered, safety glazings for motor vehicles and/or which have been assembled with the aid of plastic sheets. More specifically, the invention aims at improving forming procedures in which the glass sheets are heated and conveyed in the horizontal position through a furnace by a flat conveyor and are then made convex in a thermally insulated enclosure before being passed into a cooling station.

2. Description of the Related Art

Recent developments in the car industry have led to an ever increasing demand for glazings having complex shapes, with locally, very pronounced curvatures and in particular nondevelopable shapes, derived from spherical, noncylindrical shapes. In parallel, ever higher demands are being made on the optical quality. In the same way, a conformity to the principal curvature with close tolerances is required for all points on the surface of the glazing and not only for those close to its periphery.

Glazings having complex shapes are mainly obtained with the aid of two different technologies.

In the first, which is mainly used for glazings assembled by lamination, such as windscreens, one or two glass sheets are placed cold on a frame, whose peripheral geometry reproduces that which it is wished to give to the glass sheets and then the assembly is heated in a furnace in order to give it a convex shape by gravity. Over the last few years in order to meet the demand for ever more complex shapes, it has been proposed that pressing should take place at the end of the operation using a countermold.

In the second, which is mainly used for tempered or toughened glazings, a clear distinction is made between the stages of reheating the glass sheets, heated in a furnace which they transverse flat, conveyed by a roller bed or an air cushion, and the forming stages, which take place with the aid of tools only acting on the glass when its temperature is at a suitable level.

Thus, in the "tempering" methods, without this term having to exclude the manufacture of laminated glazings, there is a considerable reduction in the number of convex bending tools used and the immobilization time thereof for the production of a given glazing. In view of the very large number of car models, this reduction is a very important advantage, if only for the tool stock management difficulties avoided. In addition, the cycle times are generally much shorter in the case of "tempering" methods.

However, an immediate difficulty of such "tempering" methods using tools of a static nature in the sense that they do not leave the forming cell, is that there is a need for transfers of glass sheets from the conveyor to a first forming tool and in the case of complex shapes from said first tool to a complementary forming tool, which generally cooperates with the first tool and finally a support tool during cooling. All these operations can affect the quality of the glazing, because they lead to risks of marking and poor positioning, so that ultimately there is a poor optical quality and/or nonconformity with the principal curvature.

In addition, numerous so-called tempering processes are a race against time and with the aim of a greater control of the positioning of the tools, it is in fact simpler to place them in the open air outside the furnace. Under these conditions, it is obvious that the glass will cool during its convex bending. However, the tempering stage requires a minimum temperature making it necessary to overheat the glass in the furnace (but then necessarily its optical quality is affected) and/or very rapidly perform the convex bending, which is only possible if the sought shape is of a simple nature. It has admittedly been proposed to preform the glazings before passing them to a convex bending station by pressing between a solid male mold and a female mold, the preforming being obtained by passing the glass at the end of the furnace onto rotary elements such as rollers of the spindle or guide roll type, or onto guide boards. However, these elements are themselves an important source of defects and it is virtually impossible to correctly position the moving glass on such elements. A positioning prior to the entry into the preforming zone is certainly possible, but its effectiveness is relative and once again depends on the complexity of the desired shape, a "simple" shape being much more "tolerant" with respect to the positioning quality. Moreover, the preforming due to rotary elements is cylindrical, but it has been stated hereinbefore that the most complex shapes are spherical, with locally small longitudinal and transverse radii of curvature. Cylindrical preforming only makes it possible to approach one of these radii of curvature.

These cold technologies are opposed by hot technologies in which the forming cell is an integral part of the furnace or is at least thermally insulated so as to maintain therein a temperature substantially identical to the temperature of the glass when it leaves the furnace. It is then possible to extend by a few seconds the time devoted to the forming operation, which on the one hand makes it possible to minimize the temperature on leaving the furnace and on the other hand give more pronounced convex shapings by having adequate relaxing times to avoid any breaking of the glass.

In conventional variants of these technologies, the glass is transferred from the conveyor to a male mold, whose shape it adopts under the action of pressure drop or vacuum (EP 3,391, EP 241, 355) or a rising hot air flow (EP 169,770), or gravity (WO-91/17962). Following this preforming in contact with the male mold, convex bending is completed with the aid of a centrally open, annular frame used in the case of pressing as a female counter-mold or more simply as a support during convex bending due to dropping onto said annular frame (drop forming). In the two former cases, the force acting during the preforming is also used for the transfer between the conveyor and the male mold. In the latter case, a suction pad supports the volume in order to deposit it on a lower, convex mold having a downwardly turned concavity.

It is common to all these processes that a preforming takes place by a solid male mold against which is applied the entire surface of the flat glass sheet, with the possible exception of a small marginal portion. In practice, the same is the case when the transfer between the conveyor and the male mold takes place with the aid of an annular frame, as proposed in European Patent Application Serial Nos. 520, 886 and 93.401,165.1, the latter not having been published on the filing date of the present application. Thus, in these processes, the residence of the glass sheet on the annular frame is as short as possible and the different stages can take place in the form described hereinbefore: transfer/preforming on the male mold/convex bending by pressing with the annular frame.

BRIEF SUMMARY OF THE INVENTION

The inventor has found that this procedure is not completely satisfactory when the shapes of the glazings are complex and in particular have a nondevelopability criterion, which locally exceeds 5, said criterion being defined by the formula $D = \text{Ln}\,(10^7/R_1 \times R_2)$, in which Ln designates the natural logarithm, $R_1$ and $R_2$ being equal to the main radii of curvature at the considered point and expressed in millimeters. It should be noted that this formula stresses the shaping problems which occur when both $R_1$ and $R_2$ are small.

The main difficulty encountered is the formation of marginal undulations or corrugations, in the manner which can be observed on attempting to cover a sphere with the aid of a sheet of paper, where on the edges thereof there is always too much paper, so that folds or undulations form.

The inventor has found that this problem can be solved by a process for the convex bending of a glass plate heated to the convex bending temperature in a horizontal furnace, which it traverses carried by a flat conveyor, which passes it into a convex bending cell, where it is maintained at an ambient temperature substantially identical to the convex bending temperature, in which there is provided a convex, solid, male mold in the direction of which the glass plate is vertically displaced by a concave, annular countermold in order to be pressed between the male mold and the female countermold, the contact between the glass and the male mold only taking place after a roughing phase by gravity forming on the annular countermold.

The term glass plate is used in the present invention in the sense of a glass sheet or optionally a stack of two or three superimposed glass sheets as from the time of entering the furnace and as will be described in detail hereinafter.

Thus, according to the process of the invention, a blank is formed before the pressing phase, said blank being spherically bent. In the rough phase, the central part of the glazing is advantageously free from any contact with a tool, which enables the glass to flow freely and compensate the nondevelopability of the shape imposed by the male mold by local thinning.

In a more particularly preferred variant of the invention, between the roughing phase and the pressing phase, there is a preforming phase during which the glass plate is applied against the male mold by forces of a purely pneumatic nature. During this preforming phase, the central part of the glass plate is in contact with the male mold and can consequently no longer be drawn. Nevertheless, a significant portion of the surface of the glass plate is still free from any contact with the forming tools, so that the glass can still deform in such a way as to envelop the male mold.

Thus, the forming process according to the invention consists of, in succession, the forming of a blank, the taking up again of said blank by the solid male mold and a finishing by pressing. Such a three-stage process is obviously only possible within the framework of a hot technology, where the glass is in a substantially isothermal enclosure and where the convex bending tools are permanently housed, so that normally there is no parasitic heat exchange which would interfere with the optics.

Proceeding according to the invention, a blank is formed, which has a nondevelopable shape. During the roughing phase, the central part of the glass sheet is advantageously free from any contact. Due to the action of gravity forces, it is possible for extension stresses to occur in said central part leading to an elongation of the latter, which locally leads to a slight thinning of the glass. At the same time, the material close to the edges can flow in the direction of the central part. The undesired undulations do not form during the pressing against the male mold and the deformation which can be undergone by the periphery of the glass sheet is very small and there is no longer any glass "excess".

With the prior art processes, the central part of the sheet necessarily encounters the male convex bending mold first. As soon as contact has been established, it is no longer possible to elongate the central part in such a way that the periphery of the glazing cannot totally envelop the male mold and the flow of material can only act on a marginal, peripheral portion, which does not permit a true compensation, so that undulations form.

Advantageously, the process according to the invention leads to a more uniform treatment of the entire surface of the glass sheet, because the central part is in contact with the male mold for a period of time substantially identical to that of the remainder of the glass sheet. The distance to be covered in order to reach the male mold is, due to the gravity roughing stage, approximately the same for all points on the surface of the glass plate, so that the optical quality is improved.

In certain respects the process according to the invention can be likened to forming processes conventionally used for the production of laminated glazings. Nevertheless, it must be stressed that in that case it is a so-called tempering process, where the glass enters the flat convex bending cell and at the convex bending temperature, a single tool being used for treating all the volumes. In addition, the process according to the invention makes it possible to transfer the glass, after convex bending, to a tempering frame.

For performing the process according to the invention, it is e.g. possible to use a convex bending installation like that described in EP-A-520,886 and which has a horizontal furnace terminated by a convex bending cell, where the temperature is kept close to the glass sheet convex bending temperature, said convex bending call having a member for supporting the glass in the extension of the glass sheet conveying plane and preferably of the air cushion type, a male mold having a downwardly turned convexity positioned above said support member, a concave, annular countermold, formed from a centrally open, continuous frame, displaceable between a bottom position under said conveying plane and a top position in the vicinity of the male mold and means for controlling the displacement speed of the annular countermold between its top position and its bottom position. Preferably, the support member is integral with an assembly having a plate member installed beneath the convex bending cell, outside the thermally insulated enclosure and carrying, apart from the support member, the insulating floor of the bending cell and the annular countermold, the annular mold displacement speed controls means being constituted by a system for controlling the motor-driven assembly of the annular countermold.

Such an installation can be used for obtaining thermally tempered glazings, provided that to the same is added a tempering station and means for transferring the convex bent glazings from the convex bending cell to the tempering station. It can also be used for the simultaneous convex bending of several glass sheets, which are then superimposed (generally in pairs) on entering the furnace, the stack being raised by the annular countermold, brought into contact with the male mold following an adequate time to permit roughing, engaged against the male mold by a vacuum created at the periphery of the glass sheet and then pressed against the male mold with the aid of the annular countermold. Following said passage, the glass sheets are kept for a few instants in contact with the male mold, time for lowering the annular countermold and introducing beneath the male mold a recovery frame which transfers the glass sheets into a controlled cooling station.

The process according to the invention is remarkable in the fact that there is no real modification to the installation (with the exception of the change to the convex bending tools in order to adapt to the desired shape) for passing from one production mode to another and only the cycle times devoted to the raising of the annular frame and the pressing have to be modified in order to transform an installation for tempered glazings into an installation for laminated glazings. It more particularly applies to the production of glazings locally having a nondevelopability criterion exceeding 5, which cannot be obtained with a good optical quality and a high principal curvature precision with the prior art processes.

BRIEF DESCRIPTION OF THE DRAWINGS

Other advantageous characteristics and details of the invention can be gathered from the following description relative to the drawings, wherein:

FIGS. 1 to 4 show a diagrammatic side view of forming in accordance with the process of the invention of a pair of glass sheets.

FIG. 5 is a diagrammatic representation of a glazing having a non-developability criterion reaching the value 5, with a mesh pattern viewed in elevation (FIG. 5a), front view (FIG. 5b) and three-quarter view (FIG. 5c).

DETAILED DESCRIPTION OF THE INVENTION

Figure 6:
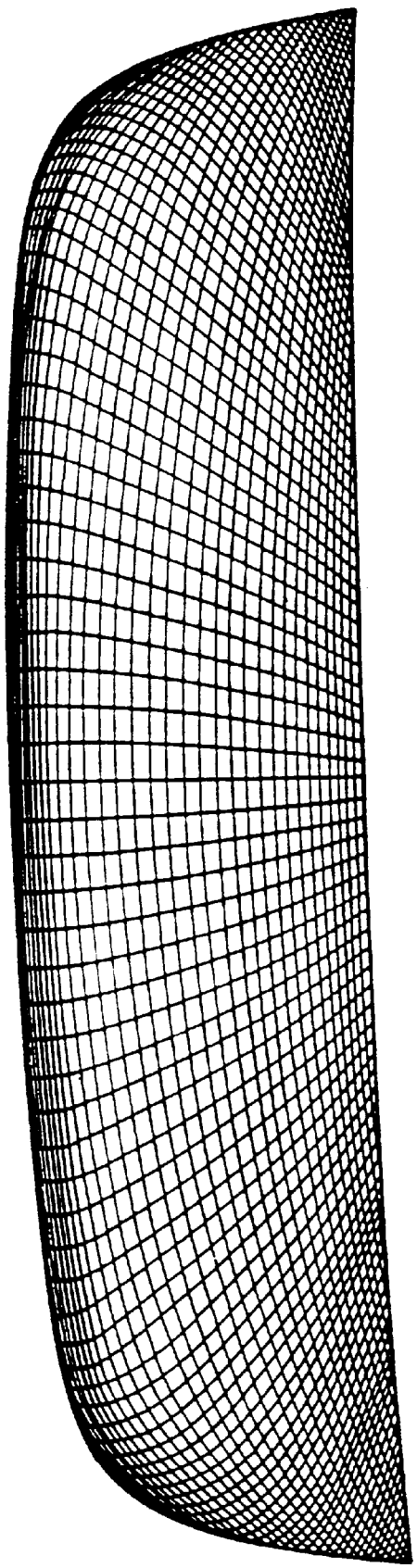
FIG. 6 is the view of a test pattern reflected by the glazing of FIG. 5.

Some of the special features of the process according to the invention are described in greater detail hereinafter relative to FIGS. 1 to 4, which illustrate the performance of the invention with an installation identical to that described in EP-520,886, which content is incorporated into the present specification by reference and to which reference should be made for further details.

Such an installation comprises a reheating furnace with a conveyor, preferably constituted by a flat roller bed 1. On leaving the furnace, the glass sheets, at a temperature of about 650° C. if they have to undergo a thermal tempering operation, or approximately 550° C. if it is a question of preparing a laminated glazing, enter the convex bending cell where they are supported by a support member, such as e.g. a hot air cushion, here symbolized by a chamber 2. For the construction of the latter, it is preferable to have a chamber 2 with a plurality of individual, transverse compartments with respect to the conveyor axis. This type of air cushion makes it possible to avoid the unbalancing of the cushion at the time of the arrival of the glazing, when only the front edge of the latter is positioned vertically of in relation to the air cushion. For more details regarding such a compartmentalization, reference is e.g. made to French Patent Application Serial No. 92/08482 filed on Jul. 9, 1992.

This convex bending cell or thermally insulated enclosure also has a convex, male mold 3, provided with means for maintaining in contact therewith a glass sheet, as well as a concave, annular countermold 4 moved between a bottom position beneath the glass sheet conveying plane and a top position in the vicinity of the male mold 3. The mold 3 and countermould 4 are referenced with respect to one another and only move in the vertical direction.

At the same time as the glass enters the convex bending cell, it is positioned by a set of focussing stops, placed ever nearer in the glass sheet advance direction. When several and in particular two superimposed glass sheets F,F' and not a single glass sheet are treated by interposing between them a separating or parting agent, such as e.g. a kieselguhr powder, said stops are preferably truncated cone-shaped stops having a diameter which is larger at the top than at the bottom, so as to position not only the lower glass sheet, but also the upper sheet which, for the purpose of forming the concave side of the laminated glazing, is normally slightly smaller than the lower sheet on the convex side. Preferably, said stops are also retractable.

In accordance with EP-520,886, the focussing stops are preferably referenced with respect to the upper, male mold 3, which is itself referenced with respect to the annular countermold 4, all these parts being obtained with a high machining precision and being preferably made from a part cast from pig iron or refractory steel.

As soon as the glass sheet or sheets are correctly focussed, the annular countermold 4 is raised, e.g. by motor-driven screw jacks, which are preferably placed outside the thermally insulated enclosure. According to the invention, the travel of these screw jacks is entirely controlled over their whole length and not only on approaching the male mold 3. For information purposes only, with a view to producing a glazing having a strong nondevelopability criterion, use has been made of the following parameters: raising the annular countermold 4, performing by the solid chamber 2, pressing with the annular countermold 4. It is also possible to have a stop time, e.g. at mid-height and to have high speed movements, as hereinbefore mentioned. It is clear that these times can differ between individual glazings, in particular as a function of the complexity of the shape to be obtained, as well as parameters such as the furnace exit temperature or the thickness of the glass sheets. However, it should be noted that the raising operation can have a duration substantially equivalent to the time during which the glass sheet is in contact with the male mold 3. During said raising and as shown in FIG. 2, the glass gives way on the annular countermold 4 under the action of the gravity forces, being free from any contact with a tool, with the exception of the marginal portion which is in contact with the annular countermold 4.

As soon as the annular countermold 4 has completed its rise and the blank has been formed, the glass sheet or sheets undergo suction action by a vacuum created at the periphery of the male mold 3. Thus, the glass is slightly disengaged from the annular countermold 4 (FIG. 3) and is engaged against the convex surface of the male mold 3. At this stage of the process, using a blank according to the invention and not a flat glass sheet offers at least two advantages. The first is that the distance to be covered by all the points of the glass sheet is substantially identical and the second is that the contact between the central part of the glass sheet and the male mold 3 is much less violent. The preforming can be likened more to a taping operation than to a punching operation, as is sometimes the case with the prior art processes. As a result of this gentler contact, the optical quality of the glass is further improved.

The final stage shown in FIG. 4 is that of pressing by the annular countermold 4. With the process according to the invention, it is merely a question of a simple finishing stage in order to complete the geometry of the edges, which does not aim at creating compressive stresses with a view to compensating the surplus material, the latter having already been "absorbed" by the flow occurring during the roughing phase. Therefore, the breakage levels are reduced, because the risks of producing residual stresses are less and the glazing is already very close to its final shape, while simultaneously reducing optical marking risks.

At the end of the pressing operation, the glass sheet or sheets are kept in contact with the male mold 3 for the time necessary for lowering the annular countermold 4 beneath the flat glass conveying plane and for introducing beneath the male mold 3 a frame for recovering the convex bent glass sheet or sheets. As a function of the particular case, this frame passes the convex bent glazing into a controlled cooling station, e.g. a radiative cooling station or into a tempering station, the recovery frame in the latter case being adapted to the discharge of the tempering air.

FIG. 5 shows a glazing shape, whereof the developability criterion locally exceeds 5, particularly due to a very significant curvature close to the wings. With the process according to the invention, this shape can be obtained with an excellent optical quality, as is shown in FIG. 6, which represents the real image of the reflection of a cross-hatched pattern projected onto a glazing obtained according to the invention and inclined by 45°, corresponding to the theoretical shape of FIG. 5. The deformation of the pattern is particularly small.

What is claimed is:

1. Process for the convex bending of a glass plate heated to a convex bending temperature in a horizontal furnace which it traverses carried by a flat conveyor which passes it into a convex bending cell where there is an ambient temperature substantially identical to the convex bending temperature and in which there is provided a convex, solid, male mold in a direction of which the glass plate is moved vertically by an annular, concave, female countermold, in order to be pressed, in a pressing phase, between the male mold and the female countermold, comprising the steps of:

preheating the horizontal furnace to the convex bending temperature;

placing a glass plate for forming by gravity on the female countermold before the glass plate comes into contact with the male mold, wherein the glass plate is a stack composed of two glass sheets which are superimposed on entering the horizontal furnace;

keeping the glass plate in contact with the male mold following the pressing phase;

obtaining suction by a vacuum created only in a vicinity of a periphery of the male mold; and producing glazings locally having a nondevelopability criterion exceeding five.

2. Convex bending process according to claim 1, further comprising the step of immobilizing the glass plates, upon entering a convex bending cell, on a chamber for supporting a central part thereof, said chamber being surrounded by the annular countermold.

3. Convex bending process according to claim 2, wherein said chamber for supporting the central part is a hot air cushion.

4. Convex bending apparatus for performing the process according to claim 1, said apparatus comprising a horizontal furnace, a male mold, a convex bending cell, in which a temperature at a convex bending temperature of the glass plate is maintained, a conveyor for supporting the glass plate in a glass plate conveying plane, said annular countermold being displaceable between a top position in the vicinity of the male mold and a bottom position beneath the glass plate conveying plane, and a device for controlling vertical displacement speed of the annular countermold, wherein the device includes motor-driven screw jacks positioned outside a thermally insulated enclosure.

5. Convex bending process according to claim 1, wherein the nondevelopability criterion is defined by the formula $D = Ln\ (10^7/R_1 \times R_2)$ in which Ln designates a natural logarithm, and $R_1$ and $R_2$ are main radii of curvature at a considered point and are expressed in millimeters.

6. Process for the convex bending of a glass plate heated to a convex bending temperature in a horizontal furnace which it traverses while being carried by a flat conveyor that passes into a convex bending cell where there is an ambient temperature substantially identical to the convex bending temperature and in which there is provided a convex, solid, male mold in a direction of which the glass plate is moved vertically by an annular, concave, female countermold in order to be pressed, in a pressing phase, between the male mold and the female countermold, comprising the steps of:

preheating the horizontal furnace to the convex bending temperature;

placing a glass plate for forming by gravity on the female countermold before the glass plate comes into contact with the male mold which is only vertically movable;

keeping the glass plate in contact with the male mold following the pressing phase;

obtaining suction by a vacuum created only in a vicinity of a periphery of the male mold in order to allow a transfer ring to receive the glass plate for direct transfer to a tempering station;

tempering the glass plate at the tempering station; and producing glazings locally having a nondevelopability criterion exceeding five.

* * * * *